United States Patent [19]
Terada et al.

[11] Patent Number: 5,499,432
[45] Date of Patent: Mar. 19, 1996

[54] FASTENING DEVICE

[75] Inventors: Yasuharu Terada, Uozu; Tsuneo Suzuki, Kurobe; Hideyuki Matsushima; Yoshiyuki Horita, both of Toyama, all of Japan

[73] Assignee: Yoshida Kogyo K.K., Tokyo, Japan

[21] Appl. No.: 239,562

[22] Filed: May 9, 1994

[30] Foreign Application Priority Data

May 10, 1993 [JP] Japan ................. 5-029691 U

[51] Int. Cl.⁶ ................................... F16B 45/02
[52] U.S. Cl. ............ 24/599.2; 24/600.2; 294/82.22
[58] Field of Search ................ 24/599.2, 600.2; 294/82.22

[56] References Cited

U.S. PATENT DOCUMENTS 1,595,264  8/1926  Treiman ................. 24/599.2 X
2,728,967  1/1956  Burnham ............... 24/599.2 X
3,545,051  12/1970  Kennard.

FOREIGN PATENT DOCUMENTS 2107814  8/1990  Japan.
2-107814  8/1990  Japan.

Primary Examiner—James R. Brittain
Attorney, Agent, or Firm—Hill, Steadman & Simpson

[57] ABSTRACT

A fastening device for fastening a web-like material to a bag or like garment article comprises a connecting member, a link rotatable relative thereto, a cylindrical retaining member fitted rotatably over the connecting member and having a retaining bar, and a hook member having a J-shaped hook. A retaining pin member is adapted to interconnect the connecting member, the retaining member and the hook member and is resiliently releasable from the retaining member to permit the latter to rotate so that the retaining bar moves out of registration with the J-shaped hook.

10 Claims, 3 Drawing Sheets

5,499,432

FASTENING DEVICE

BACKGROUND OF THE INVENTION

1. Field of the Invention

This invention relates to a fastening device for fastening or connecting a strap, belt or similar web-like materials to a bag or other garment articles.

2. Prior Art

Exemplary of such a fastening device is one which has an annular connector for connecting a loose end of a strap secured to for instance a shoulder bag or the like, a generally "J"-shaped hook member and a retainer interposed between the connector and the hook member and normally biased toward and adapted to rotatably close or open the hook member. A typical example of such a rotary type of fastener is disclosed in Japanese Utility Model Laid-Open Disclosure No. 2-107814, the disclosed device comprising a "J"-like hook member having a hook mouth at one end for releasably receiving a bag link and a support pin secured at the opposite end, a ring member adapted to connect the strap and a retaining member normally urged by a coil spring toward the hook member, both the ring and the retaining member being mounted rotatably coaxially on the support pin. Since the retaining member is brought into abutting engagement with the hook member and so retained only by the action of the coil spring, there is a tendency that when rotated accidentally, the retaining member departs from and leaves the mouth of the hook open unintentionally to release the bag link. The prior art device has a further drawback in that it involves various complicated operating parts, requiring time-consuming and tedious assembly as a whole and particularly in mounting and positioning the coil spring.

SUMMARY OF THE INVENTION

With the foregoing drawbacks of the prior art in view, the present invention seeks to provide a fastening device which incorporates means for effectively retaining the fastening device in position against accidental rotation to prevent separation of a garment article from the device.

The invention further seeks to provide a fastening device comprising a minimum number of component parts which can be assembled with utmost ease and accuracy.

The above and other objects, features and advantages of the invention will appear clear from the following detailed description taken with reference to the accompanying drawings.

According to the invention, there is provided a fastening device for fastening a web-like material to a garment article which comprises a connecting member having an opening and a hole diametrically opposed thereto; a link rotatably connected to the connecting member; a retaining member having a cylindrical bore dimentioned to fit over and rotatable relative to the connecting member and a hole communicating with the bore, and a retaining bar extending axially from the retaining member; a hook member having an axially extending connecting pin having a through-hole and passing through the retaining member into the connecting member and a J-shaped hook disposed remote from the connecting pin in normally confronting relation to the retaining bar; and a retaining pin member including a cap portion, a base portion and a spring portion interposed therebetween; and the holes being registered with one another to receive the retaining pin member with the cap portion exposed to view in the hole.

DETAILED DESCRIPTION OF THE INVENTION

Figure 1:
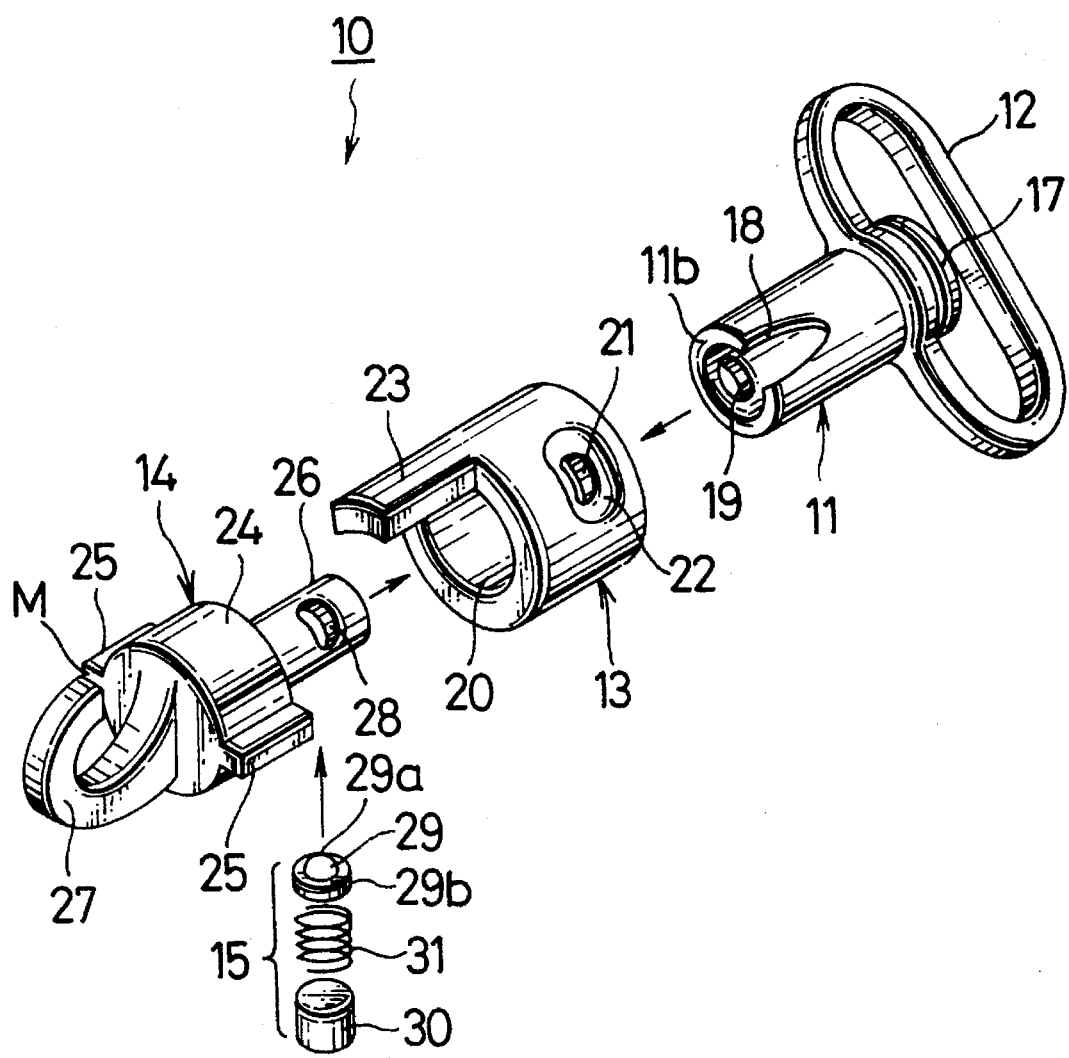
FIG. 1 is an exploded perspective view of a fastening device embodying the invention.

Referring now to the drawings and FIG. 1 in particular, there is shown a fastening device 10 constructed in accordance with the principles of the invention for fastening or connecting a web-like material to a garment article. The fastening device 10 generally comprises a connecting member 11, a loop-like link 12 rotatable relative thereto and adapted to receive a loose end of a web-like material such as a strap (not shown), a retaining member 13 in the form of a cylindrical socket, a hook member 14 having a J-shaped hook for releasably connecting a link of a garment article such as a bag (not shown), and a retaining pin member 15 adapted to join the members 11, 13 and 14 together.

Figure 2:
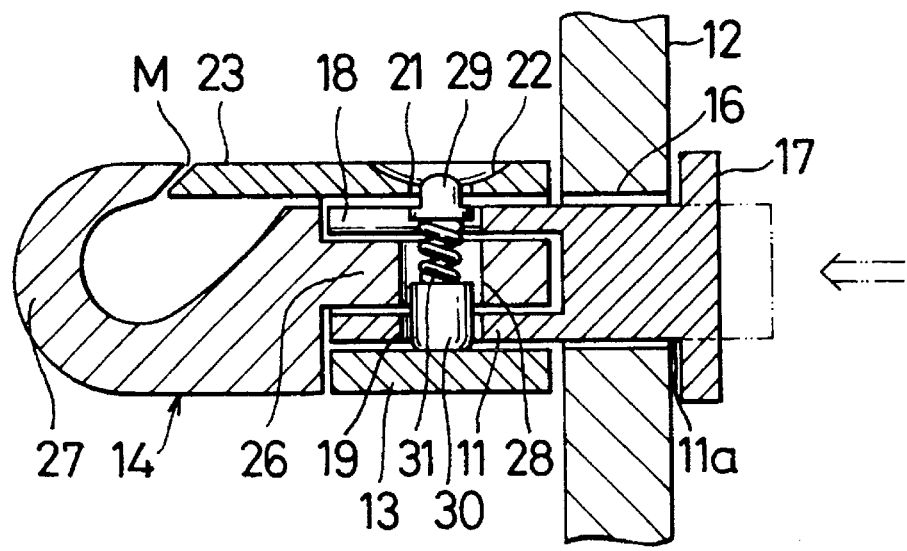
FIG. 2 is a longitudinal cross-sectional view of the fastening device.

The loop-like link 12 has a through-opening 16 for receiving one end 11a of the connecting member 11 about which the link 12 is rotatable, an extremity of which end being flanged as at 17 for holding the link 12 against detachment as better shown in FIG. 2.

The connecting member 11 is cylindrical in shape with its opposite end 11b open for receiving a portion of the hook member 14 in a manner hereafter described. The connecting member 11 is cut out at its upper peripheral wall to provide an opening 18 in the form of a substantially elongate V-shaped configuration merging with the open end 11b. A circular hole 19 is formed in the lower peripheral wall of the connecting member 11 in diametrically opposed relation to the V-shaped opening 18.

The retaining member 13 in its cylindrical form has a bore 20 sized to snugly receive the connecting member 11 and is provided with a circular hole 21 communicating with the bore 20 and merging with a bevelled cavity 22. Extending integrally axially from one end of the retaining member 13 remote from the connecting member 11 is a retaining bar 23 normally positioned in confronting relation to a hook portion of the hook member 14 so that a mouth M defined between respective tip ends of the bar 23 and the hook is closed.

The hook member 14 has a barrel 24 provided with a pair of diametrically opposed stopper fins 25, 25 and includes a connecting pin 26 extending axially from one end of the barrel 24 through the bore 20 of the retaining member 13 into the connecting member 11 as better shown in FIG. 2 and a J-shaped hook 27 extending from the opposite end of the barrel 24 for anchoring a bag link (not shown) in a manner well known in the art. The connecting pin 26 has a cross-sectionally circular radial through-hole 28 to be registered with the hole 19 in the connecting member 11 and the hole 21 in the retaining member 13, respectively.

The retaining pin member 15 is comprised of a disk-like cap portion 29, a rod-like base portion 30 and a coil spring portion 31 interposed therebetween. The cap portion 29 has a rounded top projection 29a and a peripherally projecting flange 29b.

The various parts of the fastening device 10 thus constructed may be assembled in one mode of assembly illustrated in FIG. 2.in which the connecting pin 26 of the hook member 14 is inserted into the connecting member 11 initially devoid of the flange 17 as indicated by the phantom line, in which instance the through-hole 28 in the pin 26 is registered with the opening 18 and the hole 19 in the connecting member 11, followed by mounting the retaining pin member 15 through the thus registered holes. The cylindrical retaining member 13 is fitted over the connecting member 11 from the flange-devoid end thereof and adjusted so that the cap portion 29 of the retaining pin member 15 is exposed through the hole 21 to view in the bevelled cavity 22 of the retaining member 13, in which position the retaining bar 23 is oriented to confront end-to-end with the J-shaped hook 27 thereby closing the mouth M closed. The link 12 is finally connected through its opening 16 to the connecting member 11 with the extreme end thereof being then swaged to form the flange 17.

Alternatively, the link 12 and the connecting member 11 may be formed integrally as depicted in FIG. 1. In such a case, the retaining member 13 is first fitted over the connecting member 11, followed by mounting the hook member 14 to which the retaining pin member 15 has previously been connected through the hole 28 in the connecting pin 26, in which instance the cap portion 24 of the pin member 15 is guided progressively along the V-shaped notch 18 in the connecting member 11 until it is exposed to the bevelled cavity 22 and the base portion 30 of the pin member 15 is registered with and fits into the hole 19 opposed to the opening 18, when the retaining bar 23 is held in confronting relation to the J-shaped hook 27 with the mouth M closed.

When putting the fastening device 10 thus assembled to use, the cap 29 of the pin member 15 is depressed with a finger against the tension of the spring 31 thereby releasing the retaining member 13 to be rotatable relative to the connecting member 11. Rotating the retaining member 13 in one direction until its bar 23 abuts against one of the stopper fins 25, 25 causes the mouth M to open so that a link of a bag or the like may be connected to the J-hook 27. Rotating the retaining member 13 now in the opposite direction until the bar 23 is brought back in confrontation to the hook 27 with the mouth M closed as shown in FIGS. 2 and 3, causes the cap 29 to pop out in the bevelled cavity 22 under the influence of the coil spring 31 thereby locking the retaining member 13 in position against displacement.

Figure 3:
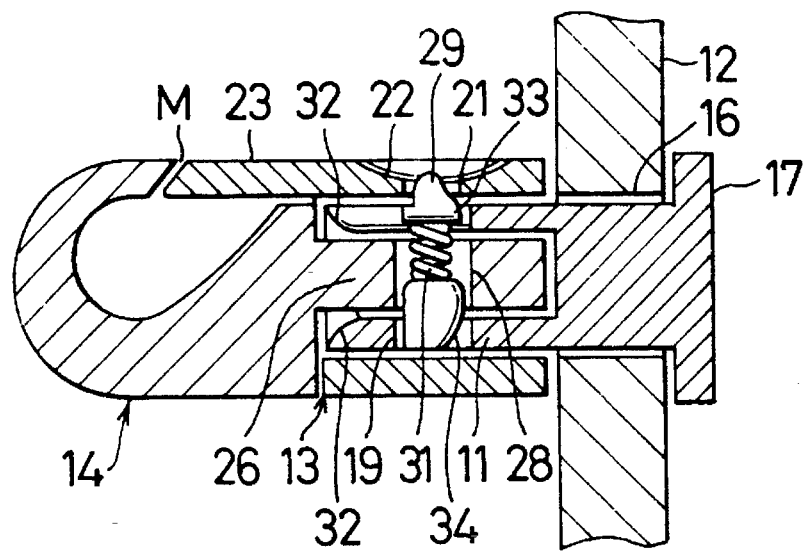
FIG. 3 is a view similar to FIG. 2 but showing a modified form of the fastening device.

FIG. 3 shows a modification of the fastening device 10 in which the open end 11b of the connecting member 11 is peripherally tapered as at 32 and the cap 29 and the base 30 of the pin member 15 are also tapered at respective peripheral sides as at 33 and 34, respectively facing the link 12, the arrangement being that mounting of the hook member 14 with the pin member 15 relative to the connecting member 11 is done with greater ease and smoothness.

Figure 4:
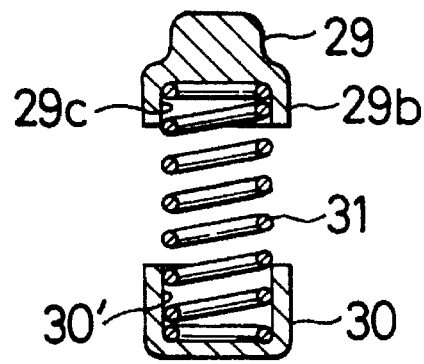
FIG. 4 is a longitudinal cross-sectional view of a retaining member consistuting part of the fastening device.

FIG. 4 shows a modified form of retaining pin member 15 in which the cap 29 and the base 30 are cut out to form pockets 29c and 30' respectively for receiving the coil spring 31 stably in place when assembling with the hook member 14.

Figure 5:
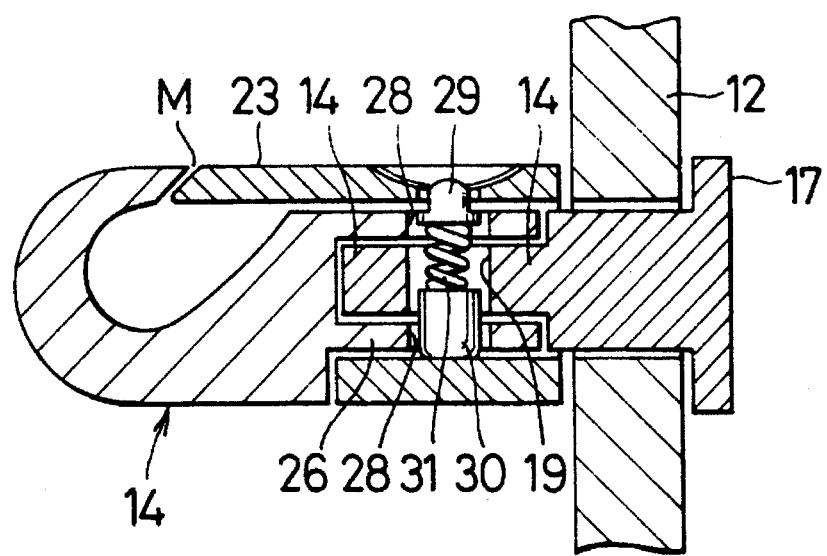
FIG. 5 is a view similar to FIGS. 2 and 3 but showing another modified form of the fastening device.

FIG. 5 illustrates another modification of the fastening device 10 wherein the cylindrical portion of the connecting member 11 is reduced in diameter and the connecting pin 26 of the hook member 14 is made cylindrical and hollow so that the connecting member 11 may be inserted through the connecting pin 26, an arrangement alternative to the basic construction hereinabove described.

There may be considered many other modifications or changes as obvious to one skilled in the art without departing from the scope of the appended claims.

What is claimed is:

1. A fastening device for fastening a web-like material to a garment article which comprises a connecting member having an opening and a hole diametrically opposed thereto; a link rotatably connected to said connecting member; a retaining member having a cylindrical bore dimentioned to fit over and rotatable relative to said connecting member and a hole communicating with said bore, and a retaining bar extending axially from said retaining member; a hook member having an axially extending connecting pin having a through-hole and a J-shaped hook disposed remote from said connecting pin in normally confronting relation to said retaining bar; and a retaining pin member including a cap portion, a base portion and a spring portion interposed therebetween; said holes including said through hole being registered with one another to receive said retaining pin member with said cap portion exposed to view in said hole of said retaining member.

2. A fastening device according to claim 1 wherein said retaining member has a bevelled cavity merging with said hole of said retaining member.

3. A fastening device according to claim 1 wherein said hook member is provided with a stopper fin for abutting engagement with said retaining bar.

4. A fastening device according to claim 1 wherein said connecting member and said link are a one-piece structure.

5. A fastening device according to claim 1 wherein said connecting member has one end peripherally tapered.

6. A fastening device according to claim 1 wherein said cap portion and said base portion are tapered at their respective sides.

7. A fastening device according to claim 1 wherein said cap portion and said base portion are provided with pockets respectively.

8. A fastening device according to claim 1 wherein said hook member extends into said connecting member.

9. A fastening device for fastening a web-like material to a garment article comprising:

a connecting member having a cylindrical shape with an open end with a first hole extending radially through a side wall of said cylindrical shape;

a link rotatably connected to said connecting member;

a retaining member having a cylindrical bore dimentioned to fit over and be rotatable relative to said connecting member and having a second hole directed radially through said retaining member communicating with said cylindrical bore, and having a retaining bar extending axially from said retaining member;

a hook member having an axially extending connecting pin having a third hole extending radially through said pin and a J-shaped hook disposed remote from said connecting pin in normally confronting relation to said retaining bar; and a retaining pin member including a cap portion, a base portion and a spring portion interposed therebetween;

said first, second and third holes being in registry with one another to receive said retaining pin member, with said cap portion exposed to view in said second hole.

10. A fastening device according to claim 9 wherein said cylindrical shape of said connecting member receives a portion of said connecting pin therein through said open end.

* * * * *